June 22, 1943.   W. G. BENNETT   2,322,412
PNEUMATIC TIRE TREAD AUGMENTING MEANS
Filed Feb. 2, 1942
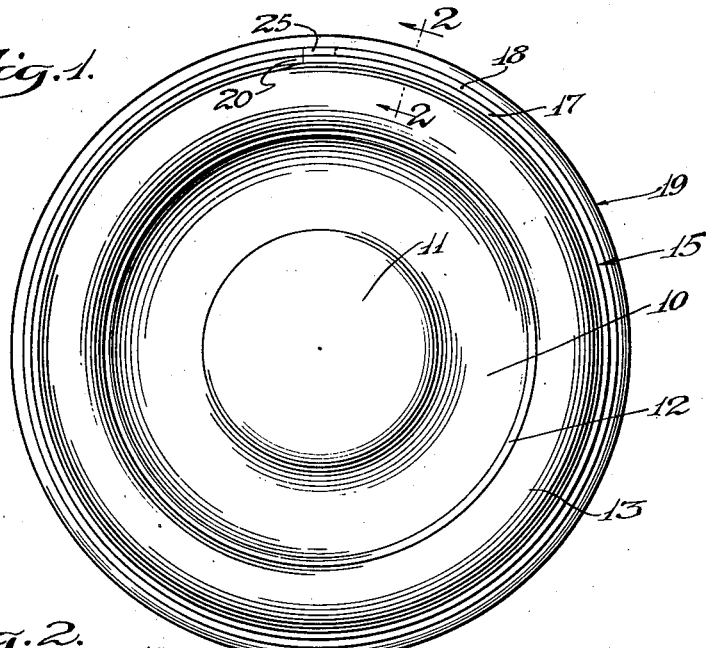
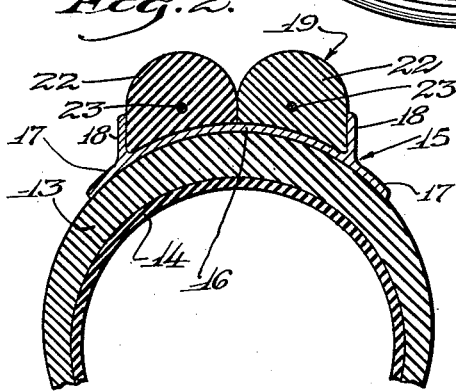
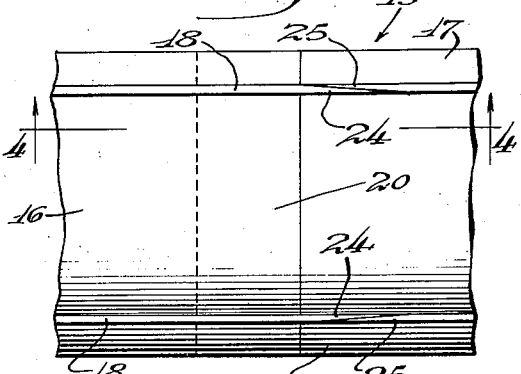
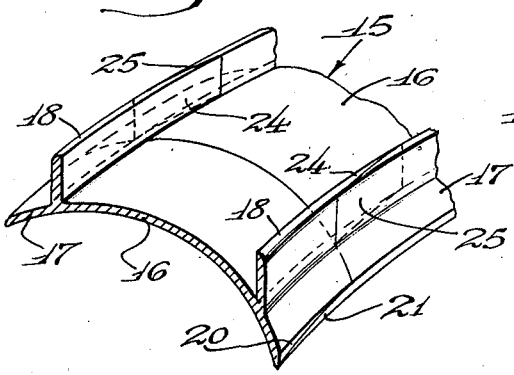
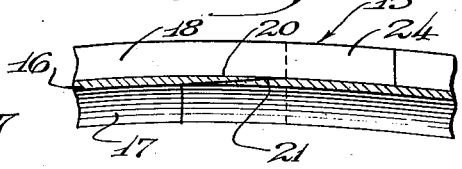
Inventor:
William G. Bennett
By Lee J. Gary
Attorney

UNITED STATES PATENT OFFICE 2,322,412

PNEUMATIC TIRE TREAD AUGMENTING MEANS

William G. Bennett, Chicago, Ill.

Application February 2, 1942, Serial No. 429,217

9 Claims. (Cl. 152—175)

This invention relates to improvements in pneumatic vehicle tires, and particularly to means constructed and arranged to protect and extend the life of pneumatic tire casings, especially those which have been worn down by extensive use.

Retreading of worn tire casings is practiced at present, but this requires extensive skill and expensive vulcanizing equipment not generally available to owners of small enterprises such as gas stations and garages, and not at all to the individual. Additionally such retreading generally only applies to the tread surface and not to the side walls.

My invention provides means whereby a protective metallic shield or armor is provided over the casing tread and by means of integral flange-like portions a considerable portion of the side walls are covered, and extending from the surface adjacent the juncture of the tread and side wall shield portions, channel means are provided for mounting and retaining supplemental tread rubber portions, as hereinafter more fully described.

My invention is not only adapted for use with old tires, but may be availed of to preserve and protect relatively new pneumatic tires, and also for such uses as to provide special or conventional anti-skid patterns for the tires of pleasure cars, trucks, busses, tractors and the like, whether new or used, and in some instances for temporary use on required limited occasion.

My invention permits use to be made of reclaimed, synthetic or low grade rubbers since the pneumatic character of the tire casing and tube is substantially retained and is not altered by or subjected to any further heat or vulcanization treatment, and compatability of the rubber material added by my invention need not be considered with respect to the casing on which it is mounted. Also, as hereinafter more fully set forth, all of the portions added to the tire casing by my invention have resilience or are susceptible of expansion and contraction so as to permit the tire casing to operate in a substantially normal manner.

Other objects and advantages of my invention will be apparent from a consideration of the following specification and drawing, wherein:

Fig. 1 is a side elevation of a wheel and a pneumatic tire illustrating my novel tire augmenting means applied thereto.

Fig. 2 is a fragmentary and enlarged transverse sectional view of the tire augmenting means taken on the line 2—2 of Fig. 1, diagrammatically illustrating the component shielding means and a specific form of supplemental tread mounted thereby.

Fig. 3 is a fragmentary top plan view of the shield portion of my tire augmenting means, particularly illustrative of the jointure portion thereof.

Fig. 4 is a section taken on the line 4—4 of Fig. 3.

Fig. 5 is a fragmentary perspective view of a shield portion of my tire augmenting means, more particularly illustrative of the jointure portion thereof and supplemental to Figs. 3 and 4.

Referring to the drawing, 10 indicates a conventional vehicle wheel having a hub portion 11 and a rim 12 provided with a conventional type of pneumatic tire 13 having a conventional inner tube 14.

My tire augmentnig means comprises a casing shield and tread supplement mounting means generally indicated as 15, comprising a tread protective portion 16, integral and laterally extending flange-like portions 17 which are adapted to extend over and protect a portion of the side walls of the tire, and the generally up-standing channel member portions 18, adapted to position the tread supplement means generally indicated as 19.

The mounting shield 15 is preferably in the form of a split band of thin resilient metal, preferably steel, of from $\frac{5}{32}$ to $\frac{1}{8}$ of an inch in thickness. The tread portion 16 and side wall flange protective portions 17 are generally of a continuous curvilinear or arcuate cross-section although their shape, arc, over-all width or contour may be such as to conform to the tread surface and adjacent side wall portions of the pneumatic tire to which it is to be applied. This means that for the purposes of obtaining good and accurate fit, the shield may be constructed and arranged whereby it will best fit the conventional commercial tire shapes. It will be understood that the overall width and contour of the tread portions 16 and the flange portions 17 will be such as to insure good support and protection for the casing tread and a considerable portion of the side walls thereof, so as to protect the worn portions from puncture or abrasion and the like injury. It will also be understood that the shield portion 15 will be of sufficient diameter, or provided in sizes generally applicable to the sizes of various tires to which they are to be applied.

The tire augmenting means may be applied to the pneumatic tire 13 by deflating the tire, positioning the shield 15 thereover, and thereafter inflating the tire so that the tire casing 13 and the shield 15 are in firm frictional and internesting engagement with each other.

The shield 15 while in the form of a circular band is preferably provided with a single joint composed of the tapered overlapping ends 20 and 21. These overlapping ends are preferably in the form of an extended taper or bevel so that they overlap for a considerable extent without appreciably or suddenly forming an increase or decrease in thickness of the material comprising the shield 15, or destroying the smoothness or continuity of the inner curved surface thereof, thereby insuring a more perfect and continuous contact of the shield 15 with the outer surface of the tread and side wall portions of the tire 13. Furthermore, the beveled or tapered ends 20 and 21 of the encircling shield 15 permit said ends to readily slide or adjust themselves with respect to each other to take up the expansion or contraction of the inner tube 14 due to differences in temperatures while running, or variation in the degree of inflation or deflation or flexing of the tire casing during operation of the vehicle, all without causing a gap in the continuity of the shielding band 15.

Extending from the shield 15, adjacent to the juncture of the tread protective portion 16 and the side wall protective flange portions 17 and to an extent defining them, are the projections or upstanding channel forming portions 18. These upstanding projecting portions 18 extend entirely around the shield 15, and are spaced from each other about the width of the tread of the tire 13 and project to such a height above the surface of the shield 15 as to form a seat or channel therewith to receive and retain the tread supplement means 19 which may comprise one or more bands or solid tire portions such as two solid cushion tire portions 22 illustrated in Fig. 2. These parts 18 are preferably parallel to each other and extend at a right angle to the axis of the wheel on which the tire is mounted, although they may suitably "toe in" somewhat so as to aid in retaining or anchoring the tread supplement 19. There may also be provided one or more intermediate additional like members 18.

The tire supplementing means 19 may be in the form of single or plural unitary tires formed of either reclaimed, synthetic, so called, or even virgin rubber if obtainable, and may be either of a smooth surface or provided with conventional anti-skid patterns or may be provided with special bosses adapting them for use on farm tractors. When molded in unitary form, they may be stretched or forced over the top edge of the retaining and positioning projections 18, either before or after the shield 15 is applied to the tire 13. If desired, and to make the practice of my invention more simple by eliminating the requirement for forming the tire supplementing portion 19 to be of special molded size, use may be made of strips of solid tire cushion material provided with reenforcing means such as one or more wires 23 extending internally and longitudinally of the cushion 22. The use of reenforcing wires permits the endwise joining of lengths of tread-supplementing material by fitting a length of wire reenforced solid tire 22 about the shield 15 and within the channel forming members 18 and brazing or otherwise suitably joining adjacent end portions of reenforcing wire 23 together. This joining of the ends of the reenforcement wire or brazing them together is a conventional operation and entails the spreading or adjacent meeting ends of the tire supplement 22 during the operation and the circumferential expansion of the tire 22 thereafter so that the ends will be held firmly together or without separation at least to an extent equal to that hereinbefore set forth with respect to the overlapping ends 20 and 21 of the shield 15. While I have shown the tread supplement portion 19 to be composed of two tire portions 22 in Fig. 2 of the drawing it is to be understood that such illustration is merely diagrammatic and the portion 19 may be of a single width, or may comprise more than two units, may be endwise joined, or may be endlessly molded.

The abutting ends of the channel forming portions 18 correspond to the ends 20 and 21 of the web portion 12 and adjoining flange portions 17 of the protective shield, and are likewise tapered or beveled in an elongated wedge shaped portions so that to overlap each other, and are preferably arranged so that the ends 24 of the projections 18 correspond to the upper overlapping end 20 and overhang or project from said end 20 and pass on the inner side of the beveled or tapered ends 25 of the projections 18, corresponding to the end 21 as illustrated in Figs. 3, 4 and 5, whereby the abutting ends of the projections 18 are capable of sliding or adjusting themselves with respect to each other and to insure continuity without break of the side walls of said projections 18 when the ends 20 and 21 of the shield 15 recede from each other at any time during inflation or flexing of the tire 13. Furthermore, this arrangement of the engaging ends 24 and 25 of the projections 18 firmly locks the ends 20 and 21 of the web and side wall protective portions of the shield 15 and prevents disturbance of the proper relationship of the ends 20 and 21 and preserves alignment and adjustment of the parts connected and carried by the shield 15.

As hereinbefore indicated and set forth, my novel tire-augmenting means and the component portions thereof can be made of suitable fixed sizes for various tires, or if desirable, the shield portion 15 only may be of the generally required size and the tire supplement portion 19 may be of greater latitude in size, or on the other hand if pre-molded may be of more specific size. For the purpose of mounting the assembly or separate portions thereof on the tire, the tire 13 is first deflated and the augmenting means then properly adjusted about the tire, and when the tire is thereafter inflated to correct pressure, the respective portions uniformly and firmly engage with each other, and by means of my device the life of the tires may be extended and the casing preserved from puncture, abrasion or other injury, or the casing may be provided with anti-skid means by means of my invention, or my invention may provide hobs, or the like tractive surfaces for special work, and the entire device may be readily disengaged or dismounted from the tire to which it is attached by reversing the mounting operation.

It will also be readily understood that by means of my tire augmenting means, the material supported by the protective shield 15 may be of varying composition and of a nature not ordinarily compatible with or suitable for vulcanization to the casing 13 and may comprise either reclaimed, synthetic, or compositions of rubber and fabric and/or metals or other materials, and may be in the form of one or more endless molded elements, or one or more endwise joined strip-like elements.

I claim as my invention:

1. Pneumatic tire augmenting means comprising a tread supplement mounting and casing protective shield member in the form of a single split metallic thin circular band having tapered overlapping abutting ends, constructed and arranged to be seated on and engage the circumferential tread and adjacent side wall portions of a pneumatic tire and spaced apart projections extending from the outer surface and inwardly of the side edges of and peripherally entirely around the said band, the terminal edges of said projections being tapered and in overlapping engagement to form a smooth continuous channel thereon for the reception and positioning of a tire tread supplement.

2. Pneumatic tire augmenting means comprising a tread supplement mounting and casing protective shield member in the form of a single split metallic thin circular band having tapered overlapping abutting ends constructed and arranged to be seated on and engage the circumferential tread and adjacent side wall portions of a pneumatic tire and having spaced apart projections extending from the outer surface thereof and overhanging one end and extending peripherally around the said band to adjacent its other end and overlapping at the abutting ends to form a continuous channel thereon for the reception and positioning of a tire tread supplement.

3. Pneumatic tire augmenting means comprising a tread supplement mounting and casing protective shield member in the form of a split metallic circular band constructed and arranged to be seated on and engage the circumferential tread and adjacent side wall portions of a pneumatic tire and having a pair of substantially parallel spaced apart projections extending from the outer surface thereof and extending peripherally entirely around the said band and defining the tread area thereof to form a channel thereon for the reception and positioning of a tire tread supplement, the ends of said band and surface projections being tapered and lying normally in overlapping relationship with the overlapped ends of the surface projections spaced from but adjacent to the overlapped ends of the band.

4. A pneumatic tire casing protective shield and supplemental tread mounting member comprising a split metallic thin circular band having tapered overlapping abutting ends and constructed and arranged to be seated on and engage the circumferential tread and adjacent side wall portions of a pneumatic tire, the said band having spaced apart circular ridges projecting from the outer surfaces thereof and extending peripherally therearound and overlapping adjacent to the abutting edges of the band to form a continuous channel for the reception of a tire tread supplement, the ends of the ridges on one end of the band being overhanging and arranged on the inner or channel sides of the end of the ridges on and which terminates inwardly of the other end of the band.

5. A pneumatic tire casing protective shield and supplemental tread mounting member comprising a split relatively thin metallic circular band having tapered overlapping abutting ends and so constructed and arranged as to be adapted to be seated on and engage the cirmumferential tread and adjacent side wall portions of a pneumatic tire, the said band having spaced apart circular ridges projecting from the outer surfaces thereof and extending around the entire periphery thereof and having overlapping tapered end portions at the abutting ends of the band to form a continuous channel for the reception of a tire tread supplement, the ends of the ridges on one end of the band being overhanging and arranged to pass on the inner or channel side of the ends of the ridges on the other end of the band the ridges on said latter end terminating inwardly of the adjacent band end.

6. Pneumatic tire augmenting means comprising a tread supplement mounting and casing protective shield member in the form of a split metallic thin circular band having tapered overlapping abutting ends constructed and arranged to be seated on and engage the circumferential tread and adjacent side wall portions of a pneumatic tire and having spaced apart projections extending from the outer surface thereof and extending peripherally entirely around the said band and overlapping in elongated tapered relationship at the abutting ends to form a smooth continuous channel thereon, and a tire tread supplement seated in and positioned by said channel said projections extending beyond the band at one end thereof and the band extending beyond the projections at the opposed ends to permit overlapping of the respective parts.

7. Pneumatic tire augmenting means comprising a tread supplement mounting and casing protective shield member in the form of a split metallic thin circular band having tapered overlapping abutting ends constructed and arranged to be seated on and engage the circumferential tread and adjacent side wall portions of a pneumatic tire and having spaced apart projections extending from the outer surface thereof and extending peripherally entirely around the said band and overlapping in tapered relationship at the abutting ends to form a smooth continuous channel thereon, the ends of the projections being spaced from the ends of the band and a tire tread supplement in the form of an endless cushion tire seated in and positioned by said channel.

8. Pneumatic tire augmenting means comprising a tread supplement mounting and casing protective shield member in the form of a split metallic thin circular band having tapered overlapping abutting ends constructed and arranged to be seated on and engage the circumferential tread and adjacent side wall portions of a pneumatic tire and having spaced apart projections extending from the outer surface thereof and extending peripherally entirely around the said band and overlapping in tapered relationship at the abutting ends to form a smooth continuous channel thereon, the ends of the projections being spaced from the ends of the band and a tire tread supplement in the form of an endwise joined cushion tire seated in and positioned by said channel.

9. The combination with a wheel having a pneumatic tire mounted thereon of tire augmenting means comprising a tread supplement mounting and casing protective shield member in the form of a split metallic thin circular band having tapered overlapping abutting ends seated on and engaging the circumferential tread and adjacent side wall portions of said tire, the said band having spaced apart projections extending from the outer surface thereof and peripherally therearound and formed with tapered overlapping abutting ends corresponding to the ends of the split band the former lying adjacent to but peripherally spaced from the latter and forming a smooth continuous channel thereon and therewith, and a supplemental cushion tire supported within the channel and firmly engaged therein and positioned thereby.

WILLIAM G. BENNETT.